(12) United States Patent
Lampson et al.

(10) Patent No.: US 6,594,672 B1
(45) Date of Patent: Jul. 15, 2003

(54) GENERATING MULTIDIMENSIONAL OUTPUT USING META-MODELS AND META-OUTLINES

(75) Inventors: Dale Lampson, Sunnyvale, CA (US); Brent Beardsley, Monroe, WA (US); Matthew A. Abrams, Los Gatos, CA (US)

(73) Assignee: Hyperion Solutions Corporation, Sunnyvale, CA (US)

( * ) Notice: Subject to any disclaimer, the term of this patent is extended or adjusted under 35 U.S.C. 154(b) by 224 days.

(21) Appl. No.: 09/586,682

(22) Filed: Jun. 1, 2000

(51) Int. Cl.[7] .................................................. G06F 17/30
(52) U.S. Cl. ................................ 707/103 R; 707/104.1
(58) Field of Search ............................. 707/103 R, 100, 707/104; 705/10

(56) References Cited

U.S. PATENT DOCUMENTS

| | | | |
|---|---|---|---|
| 5,918,232 A | * | 6/1999 | Pouschine et al. ...... 707/103 R |
| 6,360,229 B2 | * | 3/2002 | Blackman et al. ...... 707/103 R |
| 6,374,252 B1 | * | 4/2002 | Althoff et al. ............... 707/100 |
| 6,377,934 B1 | * | 4/2002 | Chen et al. .................... 705/10 |
| 6,381,743 B1 | * | 4/2002 | Mutschler, III .......... 707/104.1 |

OTHER PUBLICATIONS

E.F. Codd et al., "Providing OLAP to User–Analysts: An IT Mandate," white paper published by Codd & Date, Inc., 1993.

* cited by examiner

Primary Examiner—Diane D. Mizrahi
Assistant Examiner—Yicun Wu
(74) Attorney, Agent, or Firm—Thelen Reid & Priest LLP; Robert E. Krebs

(57) ABSTRACT

Improved techniques for generating multidimensional output using a relational source database are disclosed. The techniques allow generation of instructions needed to access the source database in order to produce multidimensional output. The instructions do not need to be stored and can be generated dynamically. As a result, relational databases can be accessed without requiring additional programming and/ or changes to the relational database. The source database can be a relational database that is accessed by a variety of conceptual accessing techniques (e.g., SQL). A Meta-data manager can be used to access the source database, as well as interact with a Meta-data modeler and a Meta-data outliner. The Meta-data modeler can be used to define a Meta-model. The Meta-data outliner can be used to create one or more Meta-outlines. The Meta-model and Meta outline, together, provide a mechanism for describing the semantics of relational and OLAP models in a way that bi-directional access to physical structures in data bases can be accomplished without having to rely on "hard-coded" data values.

33 Claims, 13 Drawing Sheets

100 — Transaction Table For Reginal Store A

| W1 | W2 | W3 | W4 | W5 | W6 |
|---|---|---|---|---|---|
| $400 | | | | | |
| | | $500 | | | |
| | | | | | |
| | | | | | |
| | | | | | |

110 — Transaction Table For Reginal Store B

| W1 | W2 | W3 | W4 | W5 | W6 |
|---|---|---|---|---|---|
| | | | | | |
| | $500 | | | | |
| | | | | | |
| $550 | | | | | |

Fig. 1

GENERATING MULTIDIMENSIONAL OUTPUT USING META-MODELS AND META-OUTLINES

BACKGROUND OF THE INVENTION

1. Field of the Invention

The present invention relates generally to electronic databases. More particularly, the present invention relates to storing and retrieving data from electronic databases.

2. Description of the Related Art

One general category of application software is often referred to as a database management program or simply, a database application. Encompassed within this general category are relational database and multidimensional database systems. Relational databases are typically transactional models optimized for transactional processing, e.g., write operations. Multidimensional databases or, in technical discussions, Online Analytical Processing (OLAP) data stores are better suited for problem analysis, e.g., reading and understanding data relationships. The OLAP paradigm is described in the white paper entitled "Providing OLAP (On-line Analytical Processing) to User-Analysts: An IT Mandate" by E. F. Codd, S. B. Codd, and C. T. Salley published by Codd & Date, Inc., and incorporated by reference herein for all purposes.

Typically, a multidimensional database stores and organizes data in a way that better reflects how a user would want to view the data than is possible in a spreadsheet or relational database file. Multidimensional databases are better suited generally to handle applications with large volumes of numeric data and that require calculations on numeric data, such as business analysis and forecasting.

A dimension within multidimensional data is typically a basic categorical definition of data in a database outline (discussed in greater detail below). A multidimensional database can contain several dimensions, thereby allowing analysis of a large volume of data from multiple viewpoints or perspectives. Thus, a dimension can also be described as a perspective or view of a specific dataset. A different view of the same data is referred to as an alternative dimension. A data management system that supports simultaneous, alternative views of datasets is said to be multidimensional. Using a business application as an example, dimensions are items such as TIME, ACCOUNTS, PRODUCT LINES, MARKETS, DIVISIONS, and so on. Within each dimension, there is typically a consolidation or other relationship between items.

To elaborate, FIG. 1 illustrates transaction tables in a relational database. A transaction table may represent the weekly sales of a product in a regional store. Table 100 contains data regarding the weekly sales of different size widgets in the regional store A. For example, in week 1, the sale for 5 ounce (oz.) widgets were $400, and in week 3, the sale for 10 ounce (oz.) widgets were $500, and so forth. Similarly, table 110 may contain data about the sales of widgets in another regional store, a regional store B.

FIG. 2 illustrates how the information available in relational database may be presented as multidimensional output using a multidimensional database. The information available in FIG. 1 is represented across dimensions of TIME and PRODUCTS, in a multidimensional output 200 illustrated in FIG. 2. For example, information can be analyzed and presented across a TIME dimension, e.g., to determine the total sales of all different sizes of widgets sold in all regions for different weeks, e.g., week 1, week 2, etc. Similarly, information can be analyzed and presented based on a PRODUCT dimension, e.g., total sales of different sizes of products in all the regions.

Given that relational databases are optimized for transactional processing and multidimensional databases are more suitable for analyzing and presenting data, it is desirable to provide for methods that allow generation of multidimensional output from relational databases. In other words, it is desirable to provide a bridge between the relational and multidimensional database models, whereby data available in a relational database can be accessed and analyzed to produce multidimensional output.

Unfortunately, conventional attempts to generate multidimensional output from a relational database have been inadequate. The conventional attempts have used, by-in-large, ad-hoc methods using implementation-specific approaches requiring a significant amount of time and resources. For example, implementation-specific programming scripts, rule files, etc. have been developed to enable a conventional multidimensional database to access data in a relational database. Thus, to access a particular relational database, a significant amount of work would be required, and accessing a different relational database would require developing more implementation-specific programming scripts, rule files, etc.

Furthermore, with conventional approaches, every time there is a change in the relational database, more work is required to implement these changes so that data can be accessed and used to generate multidimensional output. For example, if a new product, a 12 oz. widget is added to the relational database, there is a need to implement more changes, e.g., write new or modify existing programming scripts, rule files, etc. This is, in part, attributed to the fact that in multidimensional models data can become part of the structure that represents the database. By way of example, the structure of PROUCTS represented in FIG. 2 needs to be modified to reflect the change, e.g., addition of a new product to the relational database. The modified structure is illustrated as structure 210 in FIG. 2.

In view of the foregoing, there is a need for an abstract modeling of data to provide improved methods for generating multidimensional output from relational databases.

SUMMARY OF THE INVENTION

Broadly speaking, the invention relates to methods, apparatus, and data structures suitable for storing and retrieving data from databases. In one aspect, the invention pertains to providing methods for accessing a source database to create an outline that can be used to generate multidimensional output suitable for presenting several aspects (dimensions) of an analytical problem. The information used to solve the analytical problem is typically maintained in the source database. The outlines created from data in the source database can be represented as Extensible Markup Language (XML) files.

In accordance with one embodiment of the present invention, a multidimensional accessing system suitable for accessing a source database is disclosed. The multidimensional accessing system includes a Meta-data manager, Meta-data modeler, and a Meta-data-outliner. The source database can be a relational database that is accessed by a variety of conceptual accessing techniques (e.g., SQL). The Meta-data manager can access the source database, as well as interact with the Meta-data modeler and Meta-data outliner. The Meta-data modeler can be used to define one or more Meta-model. The Meta-data outliner can be used to create the Meta-outlines. As will be appreciated by those skilled in the art, the Meta-model and Meta outline, together, provide a mechanism for describing the semantics of relational and OLAP models in a way that bi-directional access to physical structures in data bases can be accomplished without having to rely on "hard-coded" data values.

The invention can be implemented in numerous ways, including a system, an apparatus, a method, or a computer readable medium. Several embodiments of the invention are discussed below.

As a method of accessing data from a source database to create a Meta-outline, an embodiment of the invention includes the acts of: defining an application related to one or more dimensions of data associated with the source database; defining a Meta-model for the application, the Meta-model relating to the one or more dimensions of data associated with the source database. The Meta-outline can be used to generate multidimensional output providing a solution to a problem relating to one or more dimensions of data associated with the source database.

As a data accessing system capable of accessing a source database to create a Meta-outline which can be used to produce multidimensional output, one embodiment of the invention includes: a Meta-data modeler suitable for defining a Meta-model for the source database; a Meta-data outliner for creating a Meta-outline for the Meta-data, the Meta-outline suitable for generation of multidimensional output relating to one or more dimensions of data associated with the source database; and a Meta-data manager suitable for interacting with the Meta-data modeler and the Meta-data outliner, the Meta-data manager providing an interface which can be used to access the Meta-data modeler and the Meta-data outliner.

This invention has numerous advantages. One advantage is that multidimensional output can be generated efficiently from data available in a source database with a relational format. Another advantage is that this invention allows for dynamic generation of instructions necessary to generate multidimensional output without requiring pre-programming and pre-storing instructions. Yet another advantage is that relational to OLAP mapping can be accomplished by defining abstract models. Accordingly, relational to OLAP mapping can be accomplished without relying on data patterns, thereby allowing for more dynamic database models. Still another advantage is that the adverse risks associated with translation errors are significantly reduced. The invention also allows for the representation of multidimensional output in the form of XML files, thereby greatly facilitating the transfer of data from one system or platform to another.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1 illustrates simplified database tables of a source database.

DETAILED DESCRIPTION OF THE INVENTION

The invention generally relates to databases. Broadly speaking, the invention relates to methods, apparatus, and data structures suitable for accessing databases. In one aspect, the invention pertains to providing methods for accessing a source database to create an outline that can be used to generate multidimensional output suitable for presenting several aspects (dimensions) of an analytical problem. The information used to solve the analytical problem is typically maintained in the source database. In one embodiment, the source database is a relational database that is accessed by a multidimensional accessing system.

Embodiments of this aspect of the invention are discussed below with reference to FIGS. 3–10. However, those skilled in the art will readily appreciate that the detailed description given herein with respect to these figures is for explanatory purposes as the invention extends beyond these limited embodiments.

Figure 2:
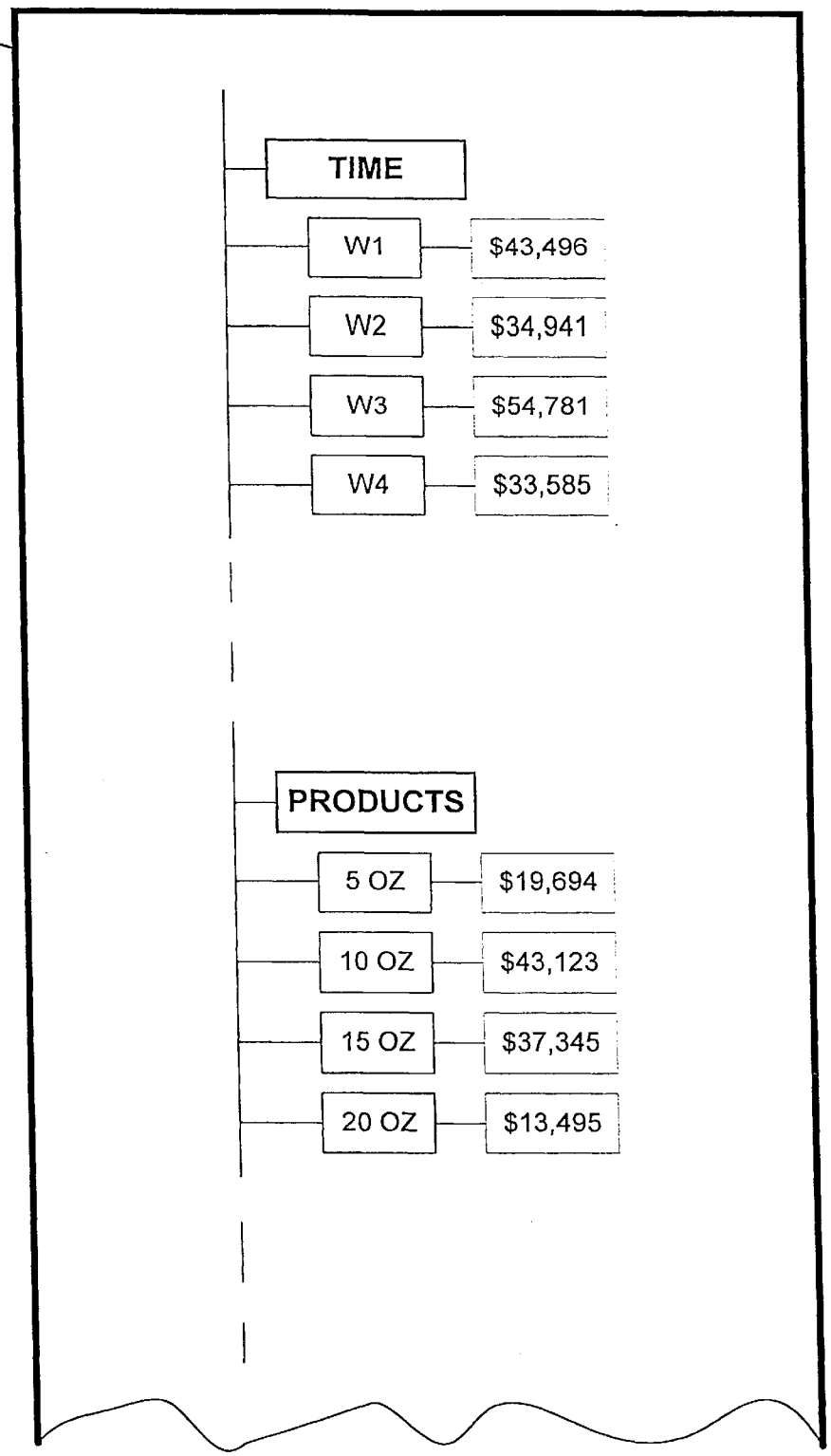
FIG. 2 illustrates multidimensional output generated by a multidimensional database.
Figure 3:
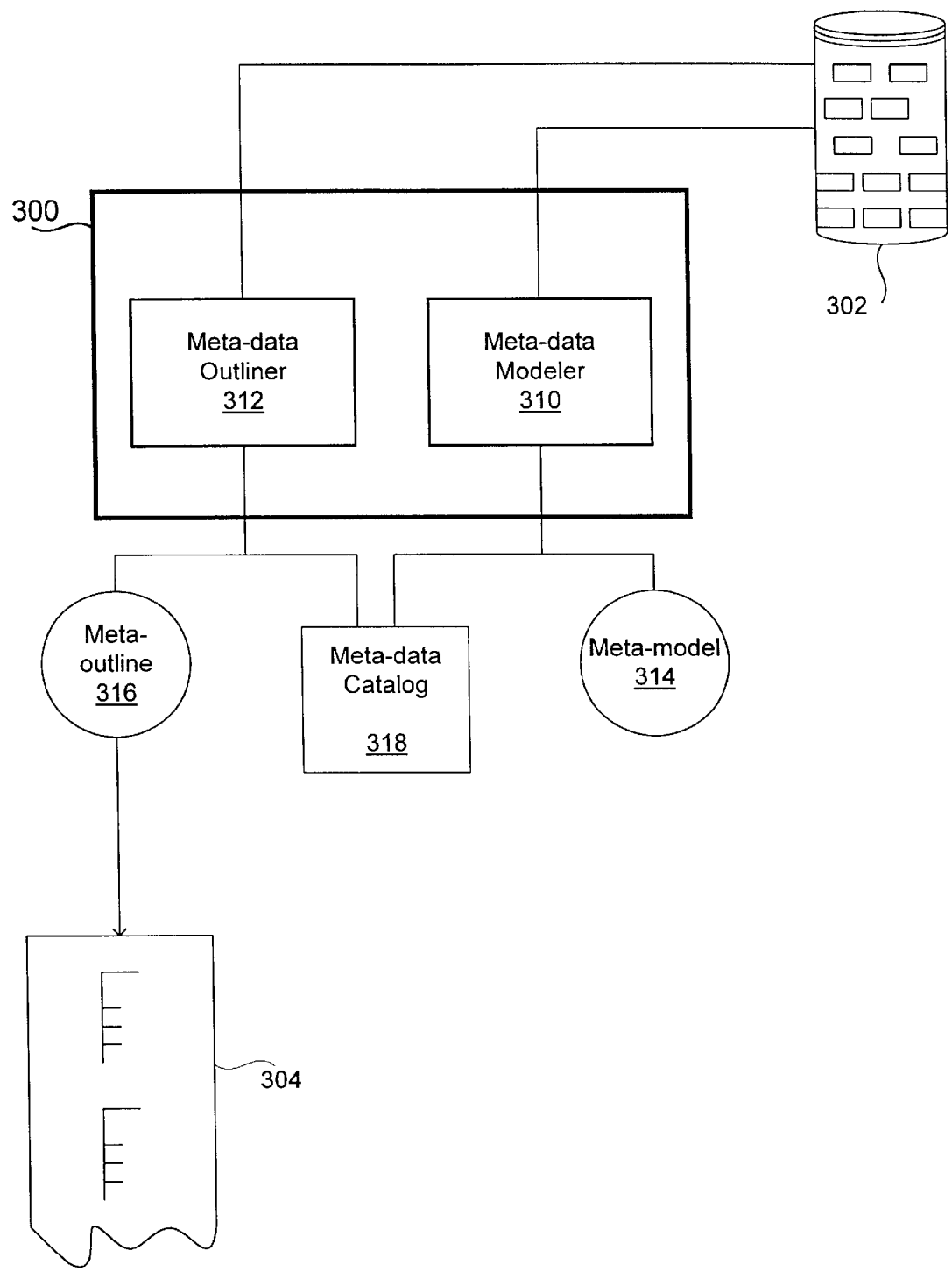
FIG. 3 illustrates an exemplary multidimensional accessing system, in accordance with one embodiment of the present invention.

FIG. 3 is a diagrammatic representation of an exemplary multidimensional accessing system 300, in accordance with one embodiment of the present invention. The multidimensional accessing system 300 accesses a source database 302 to obtain information necessary to produce a multidimensional output 304. Source database 302 can include a number of tables where data is maintained, similar to the tables illustrated in FIG. 1. The multidimensional output 304 is similar to multidimensional output 200 illustrated in FIG. 2. The source database 302 is typically a relational database, e.g., Oracle, DB2, Informix, etc. However, it should be noted that source database 302 can be any historical data record. It should also be noted that the source database 302 could have files that are in a VSAM or ISAM format, provided that a mechanism (e.g., a gateway) allows access to source database 302 in a relational format.

As shown in FIG. 3, the multidimensional accessing system 300 includes a Meta-data modeler 310 and a Meta-data outliner 312. Meta-data modeler 310 is used to define a Meta-model 314 and Meta-data outliner 312 is used to create a Meta-outline 316. The Meta-model 314 can be used to solve a multitude of analytical problems related to a general problem category. By way of a simple example, a general problem category can be "Sales" of products sold in a department and a particular problem related to the general category of "Sales" could be the third quarter sales of a particular product sold in certain stores. Broadly speaking, in one aspect, the Meta-model is a model that can be used to solve various problems related to how data is related (e.g., located) to a physical data storage structure).

Typically, the Meta-outline 316 is created based on a corresponding Meta-model, e.g., the Meta-model 314. Broadly speaking, the Meta-outline 316 is an abstraction of a particular set of multidimensional outputs that can be generated to solve the corresponding set of particular problems. Multidimensional output is generated to solve a particular problem that is related to the general problem category, such as "Sales" associated with the Meta-model, e.g., the third quarter sales of a particular product sold in certain stores. In one aspect, the Meta-outline represents a set of rules which sufficiently describes the dimensionality associated with a given model and its data instancing.

The Meta-model 314, Meta-outline 316, and any other information needed to generate multidimensional output can be stored in a data repository, e.g., a Meta-data catalog 318, in accordance with a preferred embodiment of the present invention. Among other things, Meta-data catalog 318 can provide faster and more efficient access to information needed to create a Meta-outline to generate multidimensional output. In addition, information saved in the Meta-data catalog can be used to regenerate the same or similar multidimensional outputs. Thus, the Meta-data catalog allows for generation of multidimensional output on a regular basis without requiring changes to the Meta-outline. Saving Meta-data in a catalog is especially useful if Meta-model and/or Meta-outline will be used frequently to regenerate multidimensional outputs.

Figure 4:
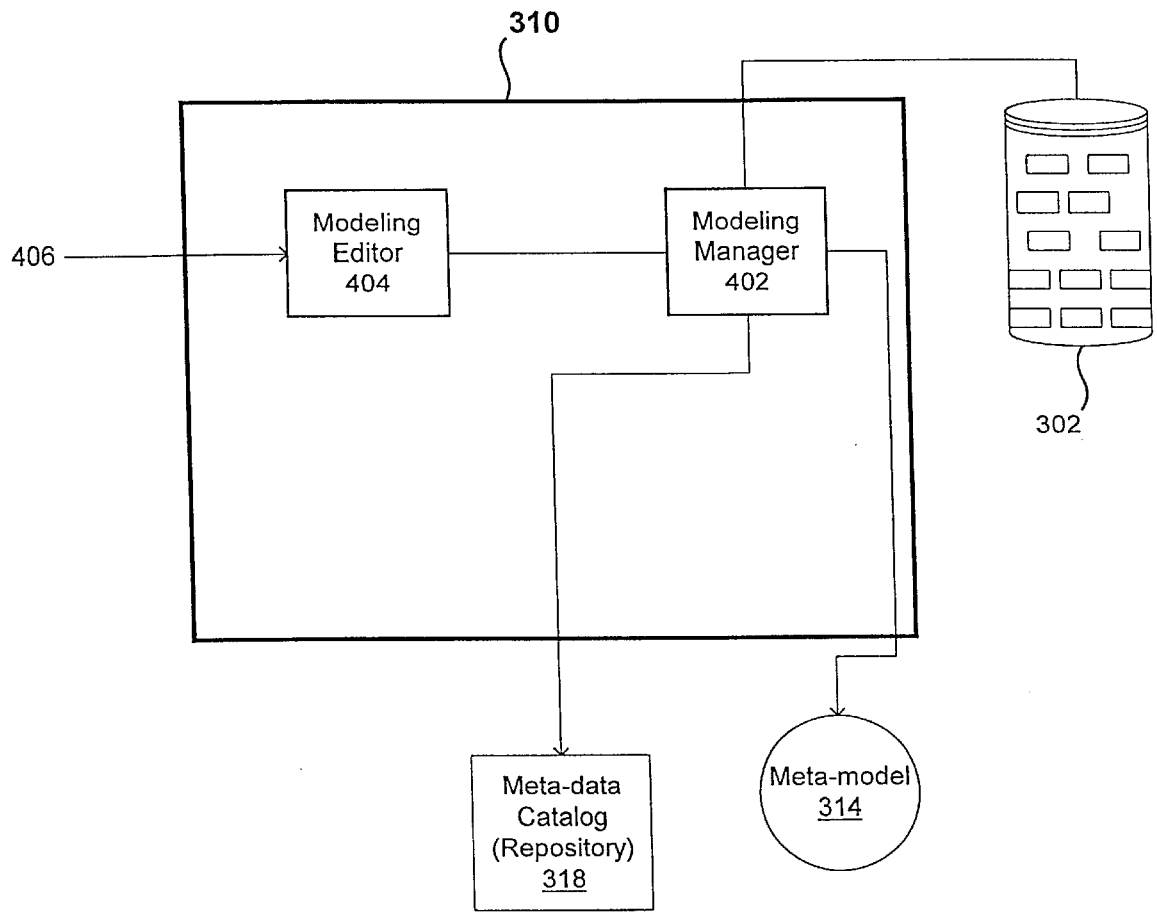
FIG. 4 illustrates an exemplary Meta-data Modeler, in accordance with one embodiment of the present invention.

FIG. 4 illustrates a Meta-Data modeler 310 including a modeling manager 402 and a modeling editor 404, in accordance with one embodiment of the present invention. The modeling manager 402 can access the source database 302 and Meta-data catalog 318, as well as interact with the modeling editor 404. Modeling editor 404 receives an input 406 that can be used to define the Meta-model 314. The input 406 can be provided by a user interacting with the modeling editor 404. The user is typically someone familiar with the source database 302. However, as will be appreciated by those skilled in the art, this user does not need to have any knowledge of the multidimensional database that will be used to access the source database 302.

Figure 5A:
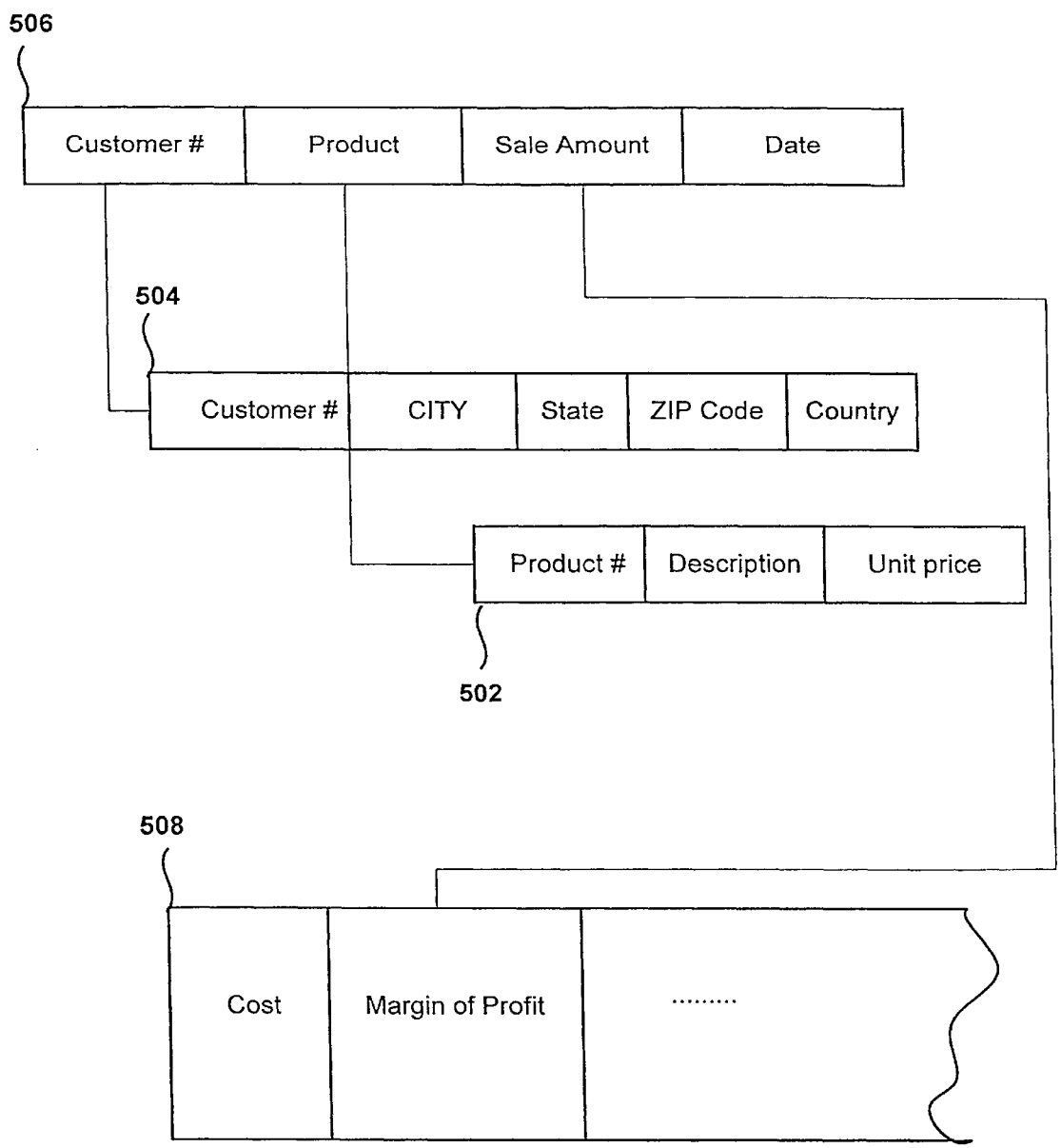
FIG. 5 illustrates relationships between data present in a source database.

Meta-model 314 allows relationships between data in the database 302 to be defined and captured in a conceptual model. To elaborate, FIG. 5A illustrates several tables present in the source database 302. These tables have been selected for the purpose of defining a Meta-model. Each table may relate to one or more dimensions, for example, product table 502 relates to a PRODUCT dimension, customer table 504 to a CUSTOMER dimension, and so on. The relationships between data represented by these tables can be identified and noted in the Meta-model.

Figure 5B:
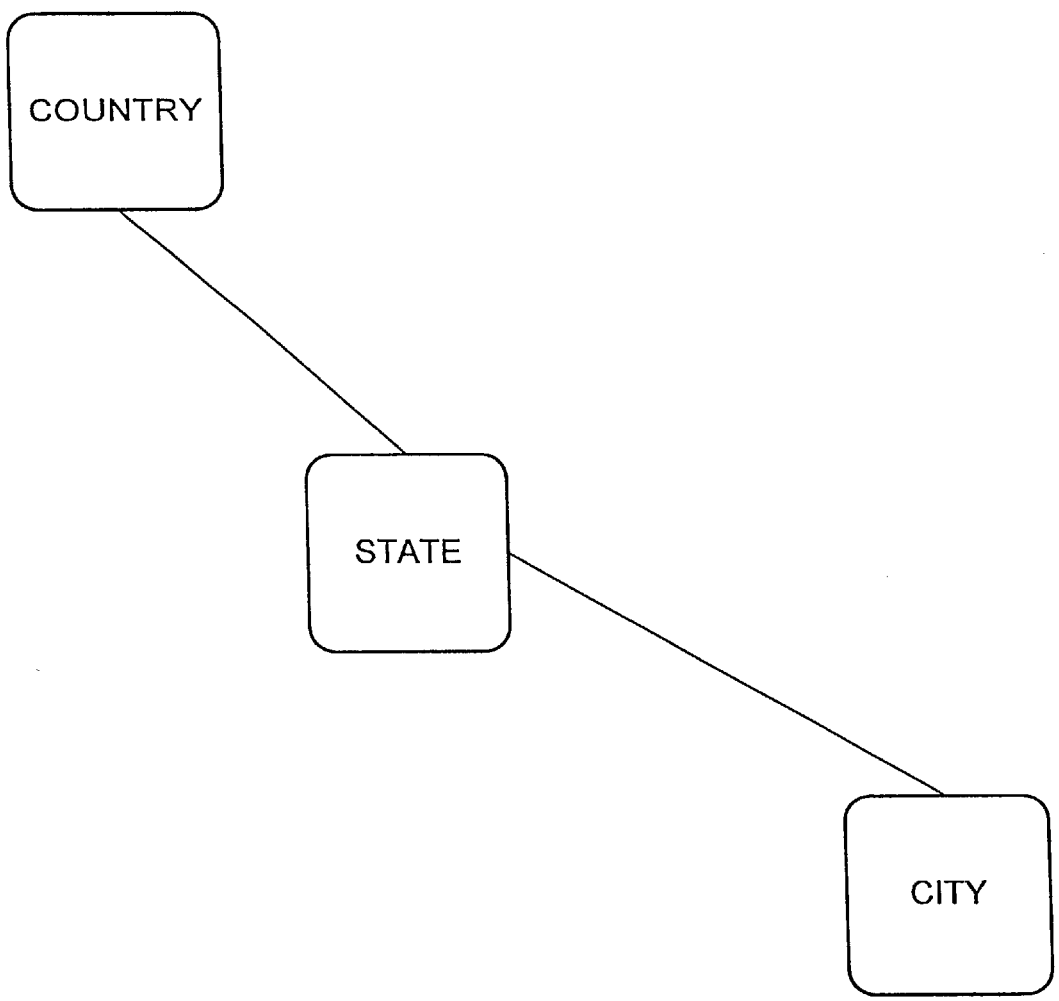

To facilitate understanding, a relationship is shown as a line connecting table entries that relate to each other. For example, table entry "customer #" in table 504 is connected with a line to table entry "customer #" in table 506. As will be appreciated by those skilled in the art, the relationships used to define a Meta-model may denote a primary key or a foreign key relationship between data in database 302. Furthermore, when defining the Meta-model, other relationships that may exist in the database may be identified. These relationships may implicitly exist between data (e.g., a relationship that is not explicitly known within the relational database schema). To illustrate, there is a hierarchical relationship between some of the entries of table 504. This hierarchical relationship is depicted in FIG. 5B, where "country" is shown as a parent of "state" and "city" is depicted as a child of "state."

In addition to defining relationships, some tables in the source database 302 maybe tagged as having qualitative data. For example, a table 508 with qualitative information relating to "sale amount" of table 506 can be tagged as having factual information that relates to one or more dimensions of data in source database 302. Table 508 may have factual information such as the cost, margin of profit, etc. associated with the "sale amount" of table 506 and the dimension of "SALES."

In accordance with one embodiment of the present invention, the modeling editor 404 presents a user with a graphical representation of database 302 to allow the user to define a Meta-model. For example, the user can select and capture relationships that are used to define the Meta-model 314. In one particular embodiment, the user is presented with a graphical representation of the tables in the database 302, similar to the representation illustrated in FIG. 5A. A relationship can be identified by the user graphically, e.g., by connecting entries together, in accordance with one embodiment of the present invention. In one embodiment, the modeling editor 404 can use the modeling manager 402 to access the database 302.

After Meta-model 314 has been defined, the modeling manager can store it in the Meta-model catalog 318. The stored Meta-model 314 can be used to create a variety of Meta-outlines that, in turn, are used to generate multidimensional output, such as the multidimensional output 304 of FIG. 3. It should also be noted that a user may also be provided with a set of pre-defined relationships "templates", in accordance with another embodiment of the present invention. As will be appreciated by those skilled in the art, a template can be provided as an outline fragment that is generally usable by more than one Meta-outline (e.g., a time fragment that defines a TIME dimension as a year, a quarter, weeks). A template may be stored in the Meta-catalog 318 and made available to users through the modeling editor 404. In one embodiment, the template is retrieved by the modeling editor 404 and presented to a user for use. The user may use the template to make further modifications, e.g., define more relationships.

In this manner, a Meta-model can be defined and used to create Meta-outlines, which in turn can be used to produce a multitude of multidimensional output. Advantageously, the Meta-model can be defined based on a relational database, without having specific knowledge of the multidimensional database that will be used to generate multidimensional output.

Figure 6:
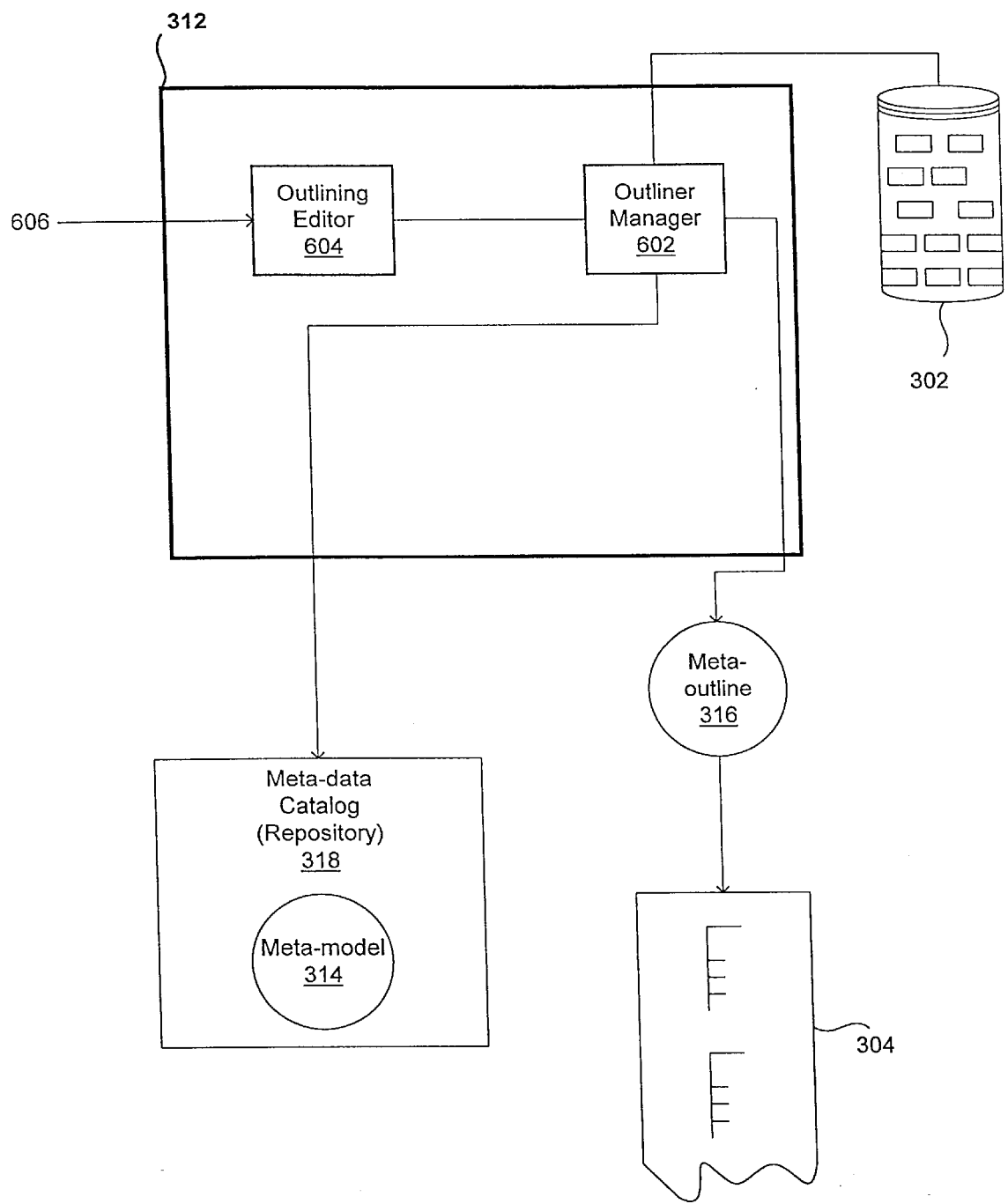
FIG. 6 illustrates an exemplary Meta-data outliner, in accordance with one embodiment of the present invention.

FIG. 6 illustrates a Meta-Data outliner 312, including an outliner manager 602 and an outlining editor 604, in accordance with one embodiment of the present invention. The outliner manager 602 can access the Meta-data catalog 318, as well as interact with the outlining editor 604. In addition, Meta-data outliner manager 602 can retrieve a Meta-model, e.g., the Meta-model 314 stored in the Meta-data catalog 318. The Meta-model 314 can be used to create the Meta-outline 316. In accordance with one embodiment, an input 606 can be provided to create the Meta-outline 316 based on the Meta-model 314.

Broadly speaking, a Meta-outline is an abstraction of the desired multidimensional output that is to be generated. To elaborate, FIG. 7A demonstrates a simplified representation of a Meta-outline 702 that corresponds to a multidimensional output 704. As shown in greater detail in FIG. 7B, the entries in multidimensional output 704 (of FIG. 7B) can represent actual data. For example, under the dimension TIME, actual sales values for actual time duration e.g., sales for week 1, week 2, etc. can be provided. The sales values can further be subdivided into actual sales values for individual days for a given week, and so forth. In contrast, Meta-outline 702 (of FIG. 7A) represents a conceptual abstraction relating to a dimension such as TIME and thus does not contain actual data. As will be appreciated by those skilled in the art, the abstraction provided by the Meta-outline allows separation of data from rules which may operate on data.

In accordance with one embodiment of the present invention, a dimension can be represented by a recursive hierarchical definition. Referring back to FIG. 7A, for example, in Meta-outline 702, dimension of TIME maybe defined by a recursive hierarchical definition Time/Time.period. Using this definition, time intervals such as week, day, morning and afternoon can be recursively defined. The hierarchical relationship between different time periods is depicted as a tree 706 of FIG. 7A. Similarly, a recursive hierarchical definition such as a region/region.subregion can be defined for the dimension of REGIONS in Meta-outline 702.

Accordingly, a user can use the outlining editor 604 (of FIG. 6) to create a desired Meta-outline, e.g., Meta-outline 316, in accordance with a particular embodiment of the present invention. By using the outlining editor 604, a user can define recursive hierarchical definitions such as those illustrated above. In addition, definitions can be pre-defined and saved in the Meta-catalog 314 and provided to a user. These definitions may include commonly used definitions, for example, a week can be defined as having 7 days since this definition is likely to be used by most users to generate multidimensional output. It should also be noted that a user may be provided with pre-defined Meta-outlines in the form of templates that are stored in Meta-data catalog 318.

Figure 7A:
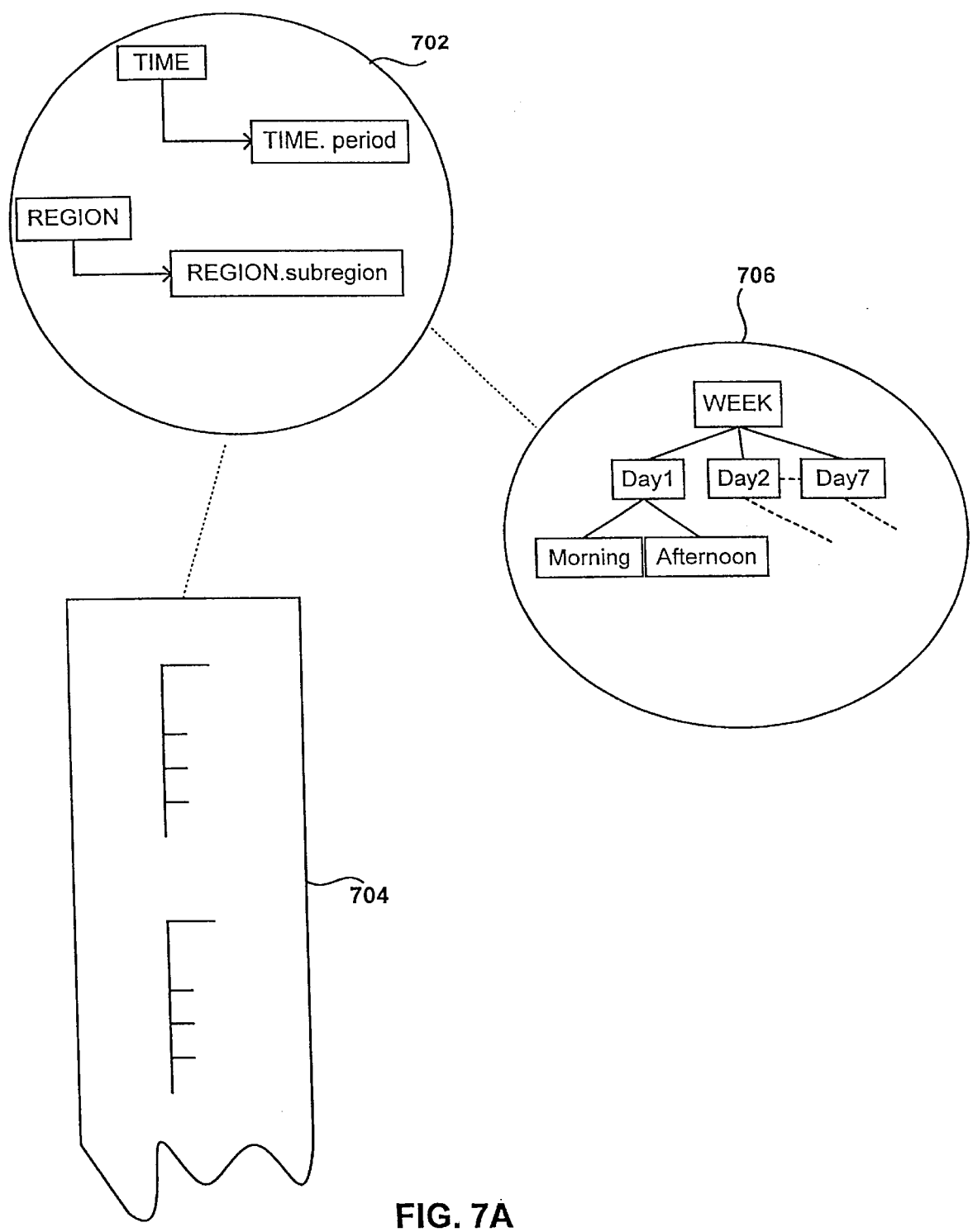
FIGS. 7A–B illustrate a Meta-outline and a multidimensional output.
Figure 7B:
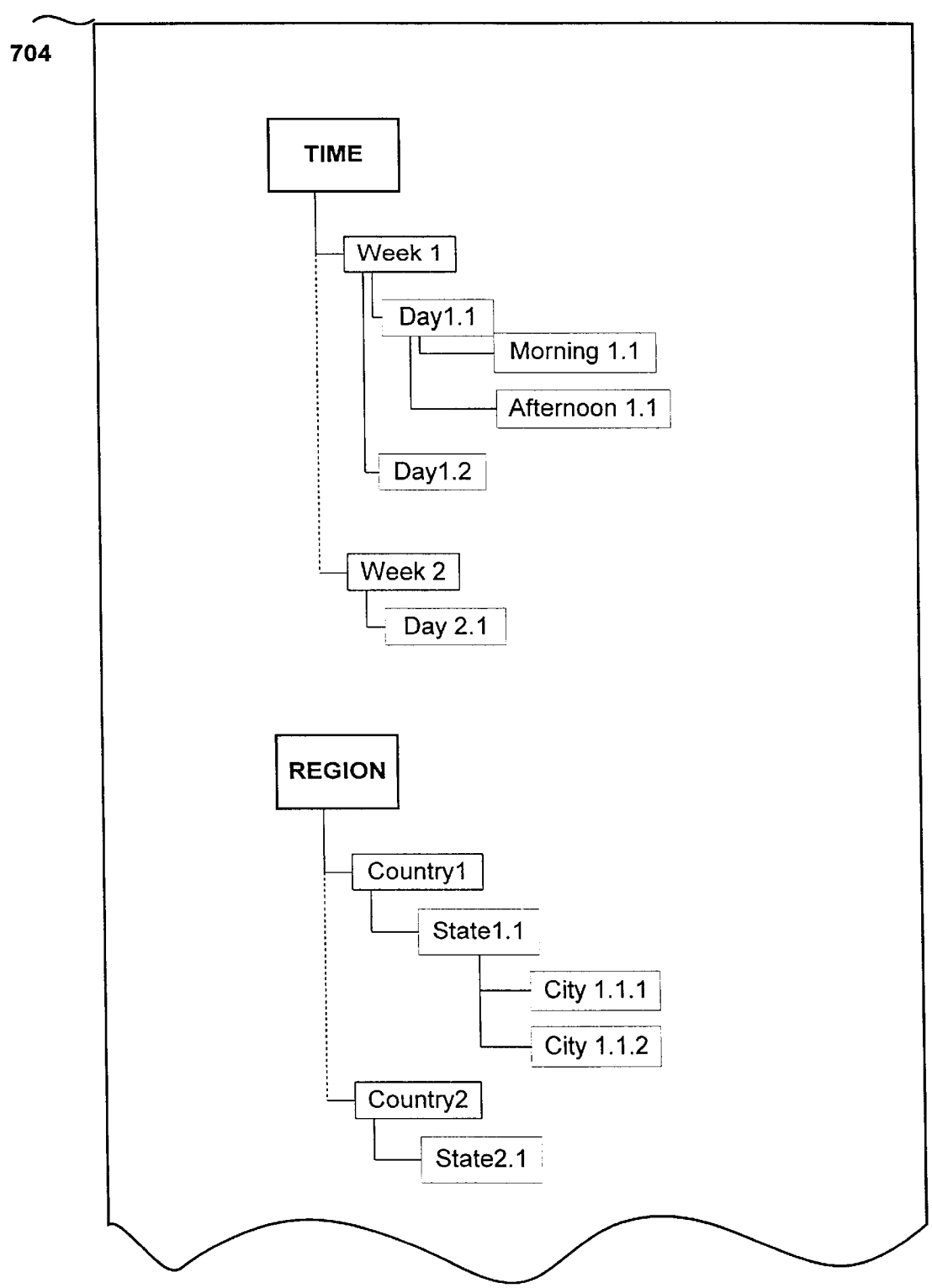
Figure 7C:
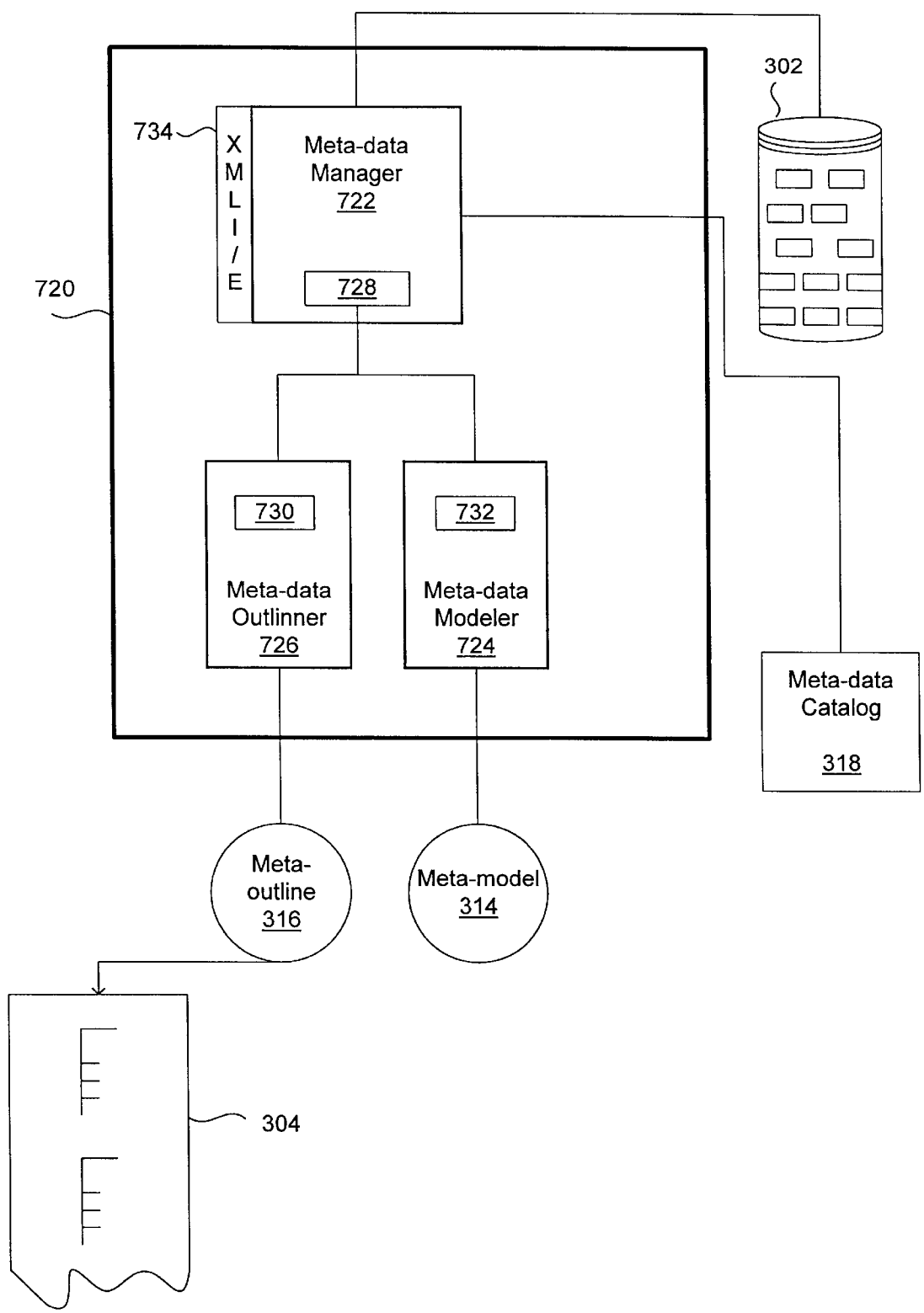
FIG. 7C illustrates an exemplary multidimensional accessing system, in accordance with another embodiment of the present invention.

FIG. 7C is a diagrammatic representation of an exemplary multidimensional accessing system 720, in accordance with another embodiment of the present invention. The multidimensional accessing system 720 accesses a source database 302 to obtain information necessary to produce a multidimensional output 304. Source database 302 can include a number of tables where data is maintained (similar to the tables illustrated in FIG. 1). The multidimensional output 304 is similar to multidimensional output 200 illustrated in FIG. 2. The source database 302 is typically a relational database, e.g., Oracle, DB2, Informix, etc. However, it should be noted that source database 302 can be any historical data record. It should also be noted that the source database 302 could have files that are in a VSAM or ISAM format, provided that a mechanism (e.g., a gateway) allows access to source database 302 in a relational format.

As shown in FIG. 7C, the multidimensional accessing system 720 includes a Meta-data manager 722, a Meta-data modeler 724, and a Meta-data outliner 726. The Meta-data manager 722 can access the Meta-data modeler 724 and Meta-data outliner 726. As will be appreciated by those skilled in the art, among other things, the data manager 722 provides an interface which can be used by application programs (or users) to gain access to the Meta-data modeler 724 and Meta-data outliner 726, in a transparent manner.

Accordingly, users (or application programs) can be provided with access to the services of the Meta-data modeler 724 and Meta-data outliner 726 without having to directly access them. Thus, users can be provided access to these services without having to know the details used to implement the Meta-data modeler 724 and Meta-data outliner 726.

In addition to providing an interface to the Meta-data modeler 724 and Meta-data outliner 726, the Meta-data manger 722 can access the Meta-data catalog 318. As noted earlier, the Meta-model 314, Meta-outline 316, and any other information needed to generate multidimensional output can be stored in a data repository, e.g., a Meta-data catalog 318, in accordance with a preferred embodiment of the present invention. It should be noted that in the embodiment shown in FIG. 7C, that users (application programs) can use the Meta-manger 722 to gain access to the Meta-data catalog 318. It should be noted that in the embodiment shown in FIG. 7C, the Meta-data catalog 318 cannot be accessed directly by either one of the Meta-data modeler 724 and Meta-data outliner 726. Accordingly, the Meta-data manager 722 provides an interface to the Meta-data catalog 318 which can be used by users, as well as the Meta-model 314 and Meta-outline 316.

In one embodiment, the Meta-data manager 722 includes a connection manager 728. The connection manager 728 interacts with connection providers 730 and 732 of the Meta-data modeler 724 and Meta-data outliner 726, respectively. As will be appreciated by those skilled in the art, the connection manager 728 can facilitate establishment of a connection (e.g., a logical session) between users and services of the Meta-data modeler 724, Meta-data outliner 726, and Meta-data catalog 318. In addition, the connection manager 728 can control the flow of data to and from the Meta-data manager 722.

An Extensible Markup Language (XML) import/export component 734 allows XML to fit in with the OLAP metadata. More specifically, XML import/export component 734 enables the import and export of data with Meta-data catalog 318. As is well known in the field of Internet application programming, raw XML documents have a hierarchical structure which stores data definitions as opposed to format tags used in HTML documents, which are geared towards displaying content (HTML can be used to display an XML document). In way of background, an XML specification has two parts: one for XML documents and one for XML Document Type Definitions (DTDs). The document portion specifies how to use tagged markups to indicate the meaning of data. The DTD portion specifies how to indicate an allowable structure for XML documents. DTDs describe the allowable structure of XML documents, although they are not required. Using a DTD is a convenient way for two parties to ensure that they are using the same data format. A DTD can constrain the pieces of data that may occur in a document, the hierarchy of data, and the number of times each piece of data may appear. Significantly, the hierarchical structure of XML documents/data and its native support for attributes closely resembles Meta-model 314 and Meta-outline 316 of the present invention.

As described above, Meta-data catalog 318 stores data needed to generate multidimensional output, particularly Meta-models and Meta-outlines. In most cases, this information is physically stored in the form of relational database tables. The volume of data and the number of tables can be large in many scenarios, such as in any large corporation. The volume of data needed to represent Meta-models and Meta-outlines can lead to problems and delays when diagnosing a problem or when transferring from one platform to another. In most cases, the entire content of Meta-data catalog 318 and the relational data source need to be copied, which can often be in the range of several gigabytes. This must be done even though only certain Meta-models and Meta-outlines are needed, for example, to diagnose a problem. In another example, going from a development platform to a production platform would also require copying the catalog, which entails copying the entire relational database. Generally, the entire Meta-data catalog 318 has to be recreated when addressing any issues regarding the Meta-models and Meta-outlines.

Relational databases now have XML interfaces which enable accessing relational data using an XML query and representing the relational data as an XML document. In the multidimensional data accessing system of FIG. 7C, XML component 734 allows a user to export or send only the relevant Meta-outlines and Meta-models as XML documents. These XML documents are typically much smaller and, consequently, easier to processing than the entire contents of the catalog. Multidimensional system 720 can employ its own DTDs to define the syntax users can use to create XML documents. More generally, since multidimensional data is structured similar to the XML hierarchical structure, an Internet-based analytical engine or a multidimensional XML server can be defined by building on XML component 734. The DTDs for the multidimensional system will be based on the general structure and format of the Meta-data catalog 318. By defining the appropriate DTDs (generally stored in XML component 734), platform transfers or trouble-shooting would only require an XML import. Thus, XML component 734 acts as an XML import/export manager that communicates with the Meta-data catalog 318 through Meta-data manager 308. Once XML component 734 communicates with the catalog 318, it produces an appropriate XML document. HTML or a proprietary version of XML can be used to display the XML document to a user via an appropriate end-user tool, such as a Web browser.

Figure 8:
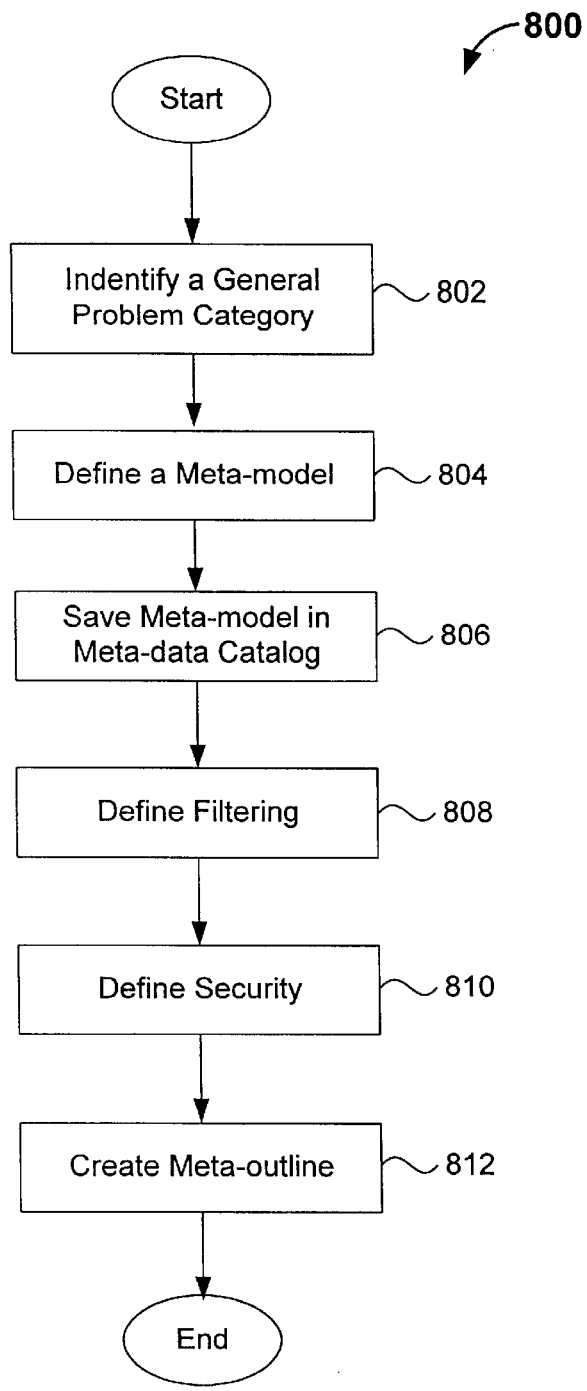
FIG. 8 illustrates a method of accessing a source database, in accordance with one embodiment of the present invention.

FIG. 8 is a flow chart representation of a method 800 for accessing a source database, in accordance with one embodiment of the present invention. Initially, as noted by operation 802, a general problem category is identified. As mentioned above, by way of example, the general problem category can be "Sales" of different products in a department store.

Next, a Meta-data model suited for solving the identified general problem category is defined, as indicated by operation 804. As mentioned earlier, a Meta-model can be defined in response to input provided by a user. Defining a Meta-model is discussed in greater detail with respect to FIG. 9. After a Meta-data model is defined, it is saved in a Meta-data catalog, as noted by operation 806. In accordance with a particular embodiment, the Meta-outline is created based on a Meta-model. The Meta-outline can be created based on input provided by a user. The user is typically interested in solving a particular problem relating to the general problem category defined in operation 802.

Any desired filtering of data (or Meta-data) can optionally be defined, as indicated by operation 808. However, it should be noted that it is not required to define filtering. Filtering can optionally be done when data is accessed from a database. By way of example, filtering can be done to focus on a few parameters that are of interest and to effectively ignore other information in the database. Filters can be defined based on input provided by a user or be pre-defined for all users. A user may define filtering parameters by using a Meta-data modeler and/or Meta-data outliner, in accordance with one embodiment of the present invention. It should be noted that some filtering parameters may be pre-defined and used by all users. Filtering parameters can be used to pre-define templates that are saved in the Meta-data catalog.

As noted by operation 810, security parameters can also be optionally defined. Among other things, security parameters can be defined to generally control and/or limit user access to information. For example, security can be defined to limit access of a Meta-model to a user (or group of users) Meta-model. As another example, limited access (e.g., read-only) can only be provided to a Meta-model. It should be noted that it is not required to define security parameters. It should also be noted that although in FIG. 8 security parameters are defined after filters are defined, security parameters can be defined before filters are defined.

Finally, as noted in operation 812, a Meta-outline is created based on the Meta-model stored in the Meta-data catalog. Using the Meta-outline, a desired multidimensional output can be generated from the information available in the source database. As will be appreciated by those skilled in the art, the Meta-outline allows generation of multidimensional data without requiring additional operational intervention. The multidimensional output provides a solution for an analytical problem. This analytical problem is a particular problem which can be described by the Meta-outline that is created in operation 806. The particular problem is related to a general problem category defined by operation 802. Advantageously, multidimensional output that is generated based on the Meta-outline (created in operation 812) can present a user with multiple dimensions of interest, while excluding inherent dimensions that may have been included in the associated Meta-model.

After the Meta-outline has been created, the corresponding multidimensional output can be generated using structural relationships outlined in the Meta-outline. In accordance with one embodiment, the source database is accessed using the Meta-model to retrieve the information necessary to create desired multidimensional output. This information typically includes the data, including the qualitative data, which is tagged in the source database, as well as values for one or more dimensions. Advantageously, the instructions necessary to access and retrieve the information in the database can be generated dynamically without requiring additional human intervention. In this way, there is no need to program and store instructions, e.g., SQL instructions to a relational database, in order to generate multidimensional data. Accordingly, instructions can be generated dynamically based on the rules defined in the Meta-model and Meta-outline. Furthermore, instructions necessary to access a relational database can be generated without requiring human intervention.

Figure 9:
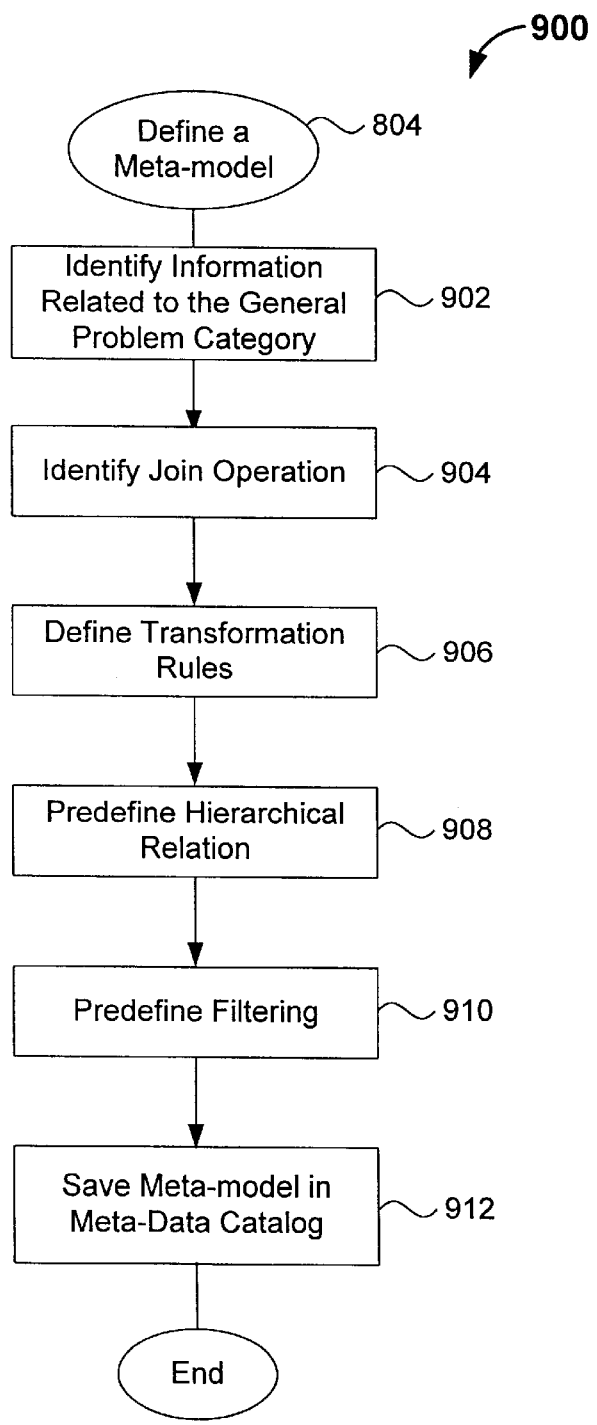
FIG. 9 illustrates a method of defining a Meta-model, in accordance with another embodiment of the present invention.

FIG. 9 is a flow chart illustrating a method 900 for defining a Meta-model (noted as 804 in FIG. 8). Initially, at operation 902, information related to the general problem category previously defined (in operation 802 of FIG. 8) is identified. By way of example, the identification of information related to a general problem category can entail scanning and selecting various tables in a database. Accordingly, the relationships between data present in various tables in the database can be defined and captured. In addition, some tables may be marked as having quantitative data relating to other tables.

Join operations needed to address a problem relating to the general problem category are identified in operation 904. As is known in the art, in order to address an analytical problem, it is often necessary to combine information typically contained in several database tables. This can generally be referred to as identifying and performing "join" operations. As will be appreciated by those skilled in the art, not all "join" operations need to be identified in operation 904.

In operation 906 of FIG. 9, transformation rules can optionally be defined. Transformation rules are typically applied to data after it has been accessed from the source database. "Transformation", as used herein, generally refers to transforming data from how it is represented in the source database to a different form, e.g., a more suitable representation for a user. By way of example, a simple transformation rule can be used to transform the source database representation of "ABC:123:8887514" to "jeans", and so on. As will be appreciated by those skilled in the art, the transformation rules do not have to be performed when they are defined, i.e., when Meta-model is defined. In accordance with one embodiment, the transformation rules are performed at run time when multidimensional output is generated.

In addition to transformation rules, one or more hierarchical relationships, including one or more recursive relationships, can optionally be predefined at operation 908. However, it should be noted that it is not required to predefine hierarchical relationships. At least one recursive hierarchical relationship can typically be defined for each selected dimension of the multidimensional output. Although recursive hierarchical relationships are typically defined when Meta-outline is created, it should be noted that it may be desirable to pre-define certain relationships when a Meta-model is defined. To illustrate, it may be more efficient to predefine the recursive hierarchical relationship: Time/Time.period, as discussed earlier. Thus, recursive hierarchical relationships can optionally be predefined when the Meta-data model is being defined.

Filters can also be optionally predefined at operation 910. Filtering of data generally refers to any desirable processing of data that is typically done prior to accessing data from the source database. By way of a simple example, it may be desirable to focus on a few parameters that are of interest and effectively ignore other parameters. Filtering may also be applied to further condense the information that is generated in the Meta-data model.

Filtering can be defined based on input provided by a user who interacts with the Modeling editor. The user is typically someone with technical knowledge and familiarity with the source database, e.g., a database administrator, or a system manager. As noted earlier, filters can be defined after a Meta-model is defined and a Meta-outline is created. However, as will be appreciated by those skilled in the art, filtering parameters can also be pre-defined when the Meta-model is being defined.

Finally, at operation 912, the Meta-model can be stored, e.g., stored in a Meta-data catalog 318 of FIG. 3, in accordance with a preferred embodiment of the present invention. As noted earlier, Meta-data, Meta-outline, and other information necessary to generate multidimensional output can also be saved in the Meta-data catalog 318. Meta-model is stored in the Meta-data catalog 318 prior to creation of a Meta-outline, in accordance with one embodiment of the present invention.

As will be appreciated by those skilled in the art, among other things, a catalog can provide faster and more efficient access to information needed to generate multidimensional output. In addition, information saved in a catalog can be reused, for example, to regenerate the same or similar multidimensional outputs based on a particular Meta-model. Storing information in a catalog is especially useful in situations when the same or similar multidimensional outputs will be regenerated frequently.

Figure 10:
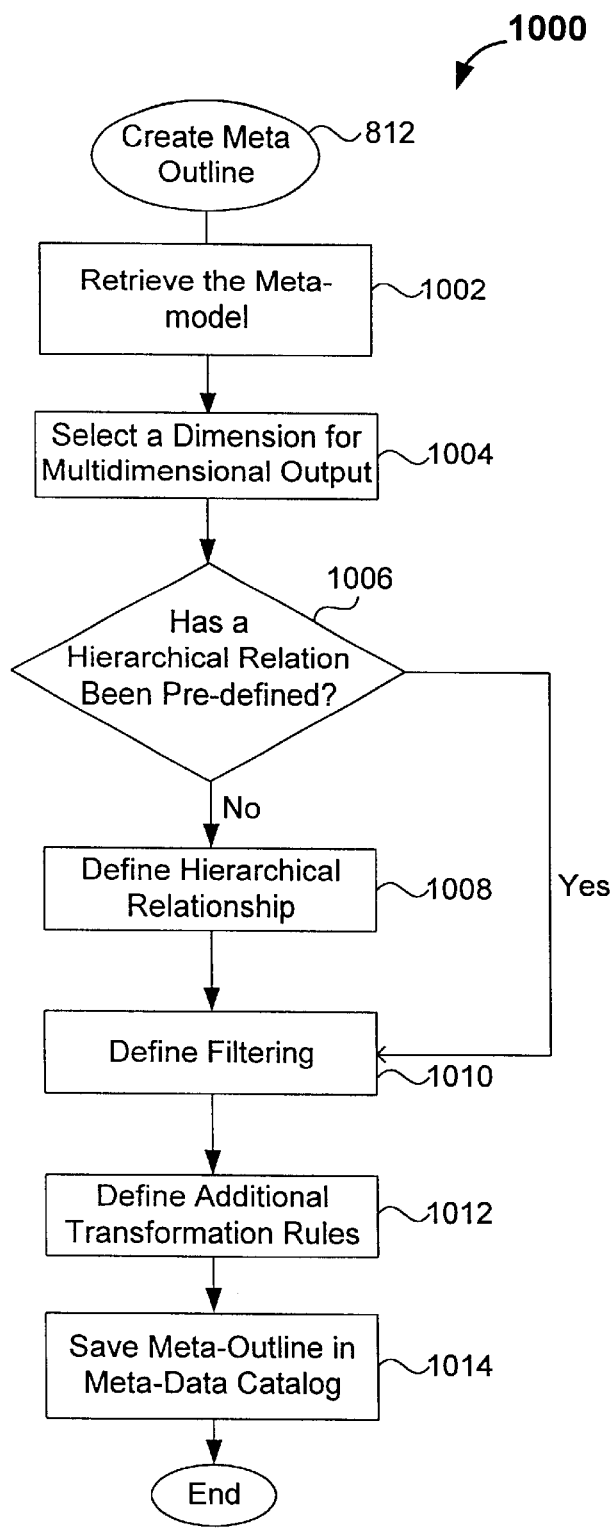
FIG. 10 illustrates a method of creating a Meta-outline, in accordance with yet another embodiment of the present invention.

FIG. 10 is a flow chart illustrating a method 1000 for creating a Meta-outline (also noted as operation 812 in FIG. 8), in accordance with a preferred embodiment of the present invention. Initially, in operation 1002, a Meta-model previously defined is retrieved. As discussed earlier, the Meta-model can be stored and retrieved from the Meta-data catalog 318.

Next, in operation 1004, one or more dimensions are selected for the multidimensional output that is to be generated. The selected dimensions typically relate to a particular problem, e.g., to determine third quarter sales for a product category sold in a specific region, for which at least two different dimensions need to be considered. After one or more dimensions are selected, a determination is made in decision 1006 as to whether at least one hierarchical relation has been pre-defined for each of the dimensions.

As previously discussed with respect to FIG. 9, one or more hierarchical relationships can be pre-defined when a Meta-model is created (see 908 of FIG. 9). If at least one hierarchical relationship is not already pre-defined for a selected dimension, then one or more hierarchical relationships are defined in operation 1008. In the case when at least one hierarchical relationship has been pre-defined and there is no need or desire to define additional hierarchical relationships, then the method 1000 proceeds to operation 1010. It should be understood that, even if there is a pre-defined hierarchical relationship, still more hierarchical relationships can be defined in operation 1008.

Once at least one hierarchical relationship has been defined, the method proceeds to operation 1010 where additional filtering may optionally be defined. Filtering can be defined in a similar manner as discussed with respect to FIG. 9. Filters can be defined by a user who is typically someone with knowledge about the general problem category and is interested in solving a related problem, e.g., a business manager of a department store. A user can interact with the outlining editor or the Meta-data manger to define filtering parameters.

In operation 1012, transformation rules can optionally be defined in a similar manner, as discussed with respect with FIG. 9. Finally, in operation 1014, the Meta-outline can be stored, e.g., stored in a Meta-data catalog 318, in accordance with a preferred embodiment of the present invention.

This invention has numerous advantages. One advantage is that multidimensional output can be generated efficiently from data available in a source database with a relational format. Another advantage is that this invention allows for dynamic generation of instructions necessary to generate multidimensional output without requiring pre-programming and pre-storing instructions. Yet another advantage is that relational to OLAP mapping can be accomplished by defining abstract models. Accordingly, relational to OLAP mapping can be accomplished without relying on data patterns, thereby, allowing for more dynamic database model. Still another advantage is that the adverse risks associated with translation errors are significantly reduced.

Although only a few embodiments of the present invention have been described, it should be understood that the present invention may be embodied in many other specific forms without departing from the spirit or scope of the invention. By way of example, although method 800 has been set forth in terms of a particular sequential order for the purposes of this explanation, it should be apparent that in many cases the ordering is not critical. For example, filtering can be defined prior to storing Meta-data Some operations may be combined or eliminated and others may be parsed into multiple operations. For example, defining transformation rules or predefining hierarchical relationships in FIG. 9 can be eliminated.

What is claimed is:

1. A method of generating multidimensional output from a source relational database, the method comprising:

defining an application related to one or more dimensions of data stored in the source relational database; the application having at least one associated problem which can be solved using one or more dimensions of the data which are stored in the source relational database, wherein for each of the one or more dimensions of data related to the source database at least one hierarchical relationship is defined;

defining a Meta-model for the application, the Meta-model being defined for the one or more dimensions of data stored in the source relational database and indicating relationships between tables in the source relational database;

generating a Meta-outline from the Meta-model, wherein the generating of the Meta-outline includes selecting at least one of the one or more dimensions of data relating to the Meta-model and forming a conceptual abstraction identifying rules operating on data relating to said at least one selected dimension of data but not including said data; and wherein the Meta-outline can be used to generate multidimensional output from the source relational database, the multidimensional output providing a solution to the at least one problem relating to the one or more dimensions of data stored in the source database.

2. A method as recited in claim 1, wherein the method further comprises:

storing the Meta-model in a catalog.

3. A method as recited in claim 1, wherein the method further comprises:

storing the Meta-outline in a catalog.

4. A method as recited in claim 1, wherein the method further comprises:

storing in a catalog the Meta-model, the Meta-outline, and any other data needed to generate multidimensional output.

5. A method as recited in claim 1, wherein the method further comprises:

defining and applying filtering parameters, the filtering parameters being used to generate the multidimensional output.

6. A method as recited in claim 1, wherein the method further comprises:

creating an XML document from the Meta-outline and the Meta-model.

7. A method as recited in claim 1, wherein the application is a general problem category.

8. A multidimensional accessing system capable of accessing a source database to create a Meta-outline which can be used to produce multidimensional output, the multidimensional output providing a solution to a problem relating to one or more dimensions of data stored in the source database, the multidimensional accessing system comprising:

a Meta-data modeler for defining a Meta-model for an application relating to the one or more dimensions of data stored in the source database and indicating relationships between tables in the source relational database, the application having at least one associated problem which can be solved using one or more dimensions of data stored in the source database, wherein the Meta-model is defined at least in part based on input provided by a user; and a Meta-data outliner for creating a Meta-outline from the Meta-model based on at least one selected dimension of the one or more dimensions of data associated with the source database and forming a conceptual abstraction identifying rules operating on data relating to said at least one selected dimension of data but not including said data, the Meta-outline capable of operating to access data related to the one or more dimensions of data which are stored in the source database, wherein the Meta-outline is further capable of generating multidimensional output providing a solution to the problem relating to one or more dimensions of data stored in the source database.

9. A multidimensional accessing system as recited in claim 8, wherein the Meta-outline is created at least in part based on input provided by a user.

10. A multidimensional accessing system as recited in claim 8 wherein the multidimensional accessing system further comprises:

a catalog used to store data needed to generate the multidimensional output.

11. A multidimensional accessing system as recited in claim 8, wherein the data stored in the catalog includes the Meta-model and the Meta-outline.

12. A multidimensional accessing system as recited in claim 8, wherein the Meta-data modeler further comprises:

a modeling editor capable of receiving input to define the Meta-model; and a modeling manager capable of accessing the source database and interacting with the Meta-model to define the Meta-model.

13. A multidimensional accessing system as recited in claim 12, wherein the input to the modeling editor is provided by a user, and wherein the user is provided with a graphical representation of the source database to enable the user to define a desired Meta-model.

14. A multidimensional accessing system as recited in claim 12, wherein the Meta-data modeler provides at least one pre-defined Meta-model.

15. A data accessing system as recited in claim 8, wherein the Meta-data outliner further comprises:

an outlining editor capable of receiving input to create the Meta-outline; and an outliner manager capable of accessing the source database and interacting with the outlining editor to create the Meta-outline.

16. A data accessing system as recited in claim 15, wherein a graphical representation is provided to enable creation of a desired Meta-outline.

17. A data accessing system capable of accessing a relational database to allow generation of multidimensional output, the multidimensional accessing system comprising:

a Meta-data modeler for defining a Meta-model, the Meta-model including at least one relationship between data stored in the relational database, wherein the Meta-model is defined at least in part based on input provided by a user;

a Meta-data outliner for creating a Meta-outline based on the Meta-model, the Meta-outline including one or more dimensions of data selected from and associated with the relational database and forming a conceptual abstraction identifying rules operating on data relating to said one or more selected dimensions of data but not including said data, wherein the Meta-outline can be used to generate multidimensional output from the relational database which can provide a solution to a application relating to the one or more dimensions of data stored in the relational database; and a Meta-data catalog for storing the Meta-model and the Meta-outline.

18. A data accessing system as recited in claim 17, wherein the Meta-data modeler further comprises:

a modeling editor capable of receiving input to define the Meta-model; and wherein a graphic representation of the source data base can be provided to enable defining a desired Meta-model.

19. A data accessing system as recited in claim 17, wherein the Meta-data outliner further comprises:

an outlining editor capable of receiving input to create the Meta-outline, and wherein a graphic representation is provided to enable creation of a desired Meta-outline.

20. A data accessing system as recited in claim 17, wherein the data accessing system further includes:

a Meta-data manager suitable for interacting with the Meta-data modeler and the Meta-data outliner.

21. A data accessing system as recited in claim 20, wherein the Meta-data manager is capable of accessing the source database.

22. A data accessing system as recited in claim 20, wherein the Meta-data manager is capable of accessing the source database on behalf of the Meta-data modeler and the Meta-data outliner.

23. A data accessing system capable of accessing a source database to create a Meta-outline which can be used to produce multidimensional output, the data accessing system comprising:

a Meta-data modeler suitable for defining a Meta-model for the source database, the Meta-model including at least one relationship between data stored in the relational database, wherein the Meta-model is defined at least in part based on input provided by a user;

a Meta-data outliner for creating a Meta-outline for the Meta-data, the Meta-outline including one or more dimensions of data selected from and associated with the relational database and forming a conceptual abstraction identifying rules operating on data relating to said one or more selected dimensions of data but not including said data, said Meta-outline further suitable for generation of multidimensional output relating to one or more dimensions of data associated with the source database; and a Meta-data manager suitable for interacting with the Meta-data modeler and the Meta-data outliner, the Meta-data manager providing an interface which can be used to access the Meta-data modeler and the Meta-data outliner.

24. A data accessing system as recited in claim 23, wherein the Meta-data manager is capable of accessing the source database.

25. A data accessing system as recited in claim 23, wherein the Meta-data manager is capable of accessing the source database on behalf of the Meta-data modeler and the Meta-data outliner.

26. A data accessing system as recited in claim 23, wherein the data accessing system further includes a catalog suitable for storage of information needed to generate the multidimensional output, and wherein the Meta-data manager can be used to access the catalog.

27. A data accessing system as recited in claim 23, wherein the data accessing system further includes a catalog suitable for storage of information needed to generate the multidimensional output, and wherein the Meta-data manager can be used to access the catalog on behalf of the Meta-data modeler and the Meta-data outliner.

28. A data accessing system as recited in claim 23, wherein the Meta-data manager includes a connection manager, the connection manager operating to facilitate a connection between the Meta-data manager and the Meta-data modeler.

29. A data accessing system as recited in claim 23, wherein the Meta-data manager includes a connection manager, the connection manager operating to facilitate a connection between the Meta-data manager and the Meta-data outliner.

30. A data accessing system as recited in claim 23, wherein the Meta-data manager includes a connection manager, the connection manager operating to manage flow of data to and from the Meta-data manager.

31. A data accessing system as recited in claim 23, wherein the data accessing system further includes an XML component capable of creating one or more XML files from one or more Meta-outlines.

32. A data accessing system as recited in claim 31, wherein the one or more XML files have a hierarchical structure that corresponds to the one or more Meta-outlines.

33. A data accessing system as recited in claim 31, wherein the XML component is under the control of the Meta-data manager.

* * * * *